US010317563B2

(12) United States Patent
Donderici et al.

(10) Patent No.: US 10,317,563 B2
(45) Date of Patent: Jun. 11, 2019

(54) FREQUENCY RATIOMETRIC PROCESSING OF RESISTIVITY LOGGING TOOL DATA

(71) Applicant: Halliburton Energy Services, Inc., Houston, TX (US)

(72) Inventors: Burkay Donderici, Houston, TX (US); Rencheng Song, Singapore (SG); Glenn Andrew Wilson, Singapore (SG); Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/121,222

(22) PCT Filed: Oct. 26, 2015

(86) PCT No.: PCT/US2015/057311
§ 371 (c)(1),
(2) Date: Aug. 24, 2016

(87) PCT Pub. No.: WO2017/074295
PCT Pub. Date: May 4, 2017

(65) Prior Publication Data
US 2017/0261631 A1 Sep. 14, 2017

(51) Int. Cl.
*G01V 3/18* (2006.01)
*G01V 3/28* (2006.01)
(Continued)

(52) U.S. Cl.
CPC ............... *G01V 3/28* (2013.01); *G01V 3/18* (2013.01); *G01V 3/26* (2013.01); *G01V 3/38* (2013.01)

(58) Field of Classification Search
CPC .................................. G01V 3/28; G01V 3/38
(Continued)

(56) References Cited

U.S. PATENT DOCUMENTS 3,967,190 A 6/1976 Zonge et al.
4,730,161 A 3/1988 Cox et al.
(Continued)

FOREIGN PATENT DOCUMENTS

| EP | 0342920 | 11/1989 |
|---|---|---|
| WO | 2009029517 A2 | 3/2009 |
| WO | 2015051287 A1 | 4/2015 |

OTHER PUBLICATIONS

Constable et al., Marine Controlled-Source Electromagnetic Sounding 1. Modeling and Experimental Design, Journal of Geophysical Research, vol. 101, No. B3, pp. 5507-5517, Mar. 10, 1996.
(Continued)

*Primary Examiner* — Jay Patidar
(74) *Attorney, Agent, or Firm* — Alan Bryson; C. Tumey Law Group PLLC (57) ABSTRACT

A method includes introducing a resistivity logging tool including one or more transmitter coils and one or more receiver coils into a wellbore. First and second signals are then transmitted with a first transmitter coil at first and second frequencies, respectively, and a first receiver coil receives first and second response signals based on the first and second signals. A ratio between the first and second response signals is then calculated to obtain a ratio signal, and the ratio signal is processed in an inversion algorithm. One or more formation characteristics of the subterranean formation may then be determined based on the ratio signal as processed by the inversion algorithm.

18 Claims, 6 Drawing Sheets

(51) Int. Cl.
*G01V 3/26* (2006.01)
*G01V 3/38* (2006.01)

(58) Field of Classification Search
USPC .................................................. 324/323–344
See application file for complete search history.

(56) References Cited

U.S. PATENT DOCUMENTS

| | | | | |
|---|---|---|---|---|
| 5,157,605 | A | * | 10/1992 | Chandler ................. G01V 3/28 324/335 |
| 5,278,507 | A | | 1/1994 | Bartel et al. |
| 5,389,881 | A | | 2/1995 | Bittar et al. |
| 5,469,062 | A | | 11/1995 | Meyer |
| 6,163,155 | A | * | 12/2000 | Bittar ....................... G01V 3/28 324/338 |
| 6,181,138 | B1 | | 1/2001 | Hagiwara et al. |
| 6,188,222 | B1 | | 2/2001 | Seydoux et al. |
| 6,218,842 | B1 | | 4/2001 | Bittar et al. |
| 6,294,917 | B1 | | 9/2001 | Nichols |
| 6,304,086 | B1 | * | 10/2001 | Minerbo ................. G01V 3/28 324/338 |
| 6,476,609 | B1 | | 11/2002 | Bittar |
| 6,703,837 | B1 | * | 3/2004 | Wisler ..................... G01V 3/28 324/335 |
| 6,911,824 | B2 | | 6/2005 | Bittar |
| 7,019,528 | B2 | | 3/2006 | Bittar |
| 7,138,803 | B2 | | 11/2006 | Bittar |
| 7,141,981 | B2 | | 11/2006 | Folberth et al. |
| 7,265,552 | B2 | | 9/2007 | Bittar |
| 7,483,793 | B2 | | 1/2009 | Wang et al. |
| 7,539,279 | B2 | | 5/2009 | Lu et al. |
| 7,548,817 | B2 | | 6/2009 | Hassan et al. |
| 7,579,841 | B2 | | 8/2009 | San Martin et al. |
| 7,612,565 | B2 | | 11/2009 | Seydoux et al. |
| 7,696,756 | B2 | | 4/2010 | Morys et al. |
| 7,755,361 | B2 | | 7/2010 | Seydoux et al. |
| 7,786,733 | B2 | | 8/2010 | Seydoux et al. |
| 7,825,664 | B2 | | 11/2010 | Homan et al. |
| 7,888,941 | B2 | | 2/2011 | San Martin et al. |
| 7,894,990 | B2 | | 2/2011 | Wang et al. |
| 7,924,013 | B2 | | 4/2011 | Seydoux et al. |
| 7,966,874 | B2 | | 6/2011 | Hassan et al. |
| 8,015,868 | B2 | | 9/2011 | Hassan et al. |
| 8,085,050 | B2 | | 12/2011 | Bittar et al. |
| 8,190,369 | B2 | | 5/2012 | Moos et al. |
| 8,274,289 | B2 | * | 9/2012 | Bittar ..................... E21B 47/024 324/338 |
| 8,466,682 | B2 | | 6/2013 | Wang |
| 8,736,270 | B2 | | 5/2014 | Seydoux et al. |
| 8,862,405 | B2 | | 10/2014 | Seydoux et al. |
| 8,866,483 | B2 | | 10/2014 | Bittar et al. |
| 8,933,699 | B2 | | 1/2015 | Seydoux et al. |
| 2004/0012392 | A1 | | 1/2004 | McCormick et al. |
| 2004/0027131 | A1 | * | 2/2004 | Bittar ....................... G01V 3/28 324/338 |
| 2010/0017137 | A1 | | 1/2010 | Legendre et al. |
| 2014/0249754 | A1 | | 9/2014 | Donderici et al. |
| 2014/0350858 | A1 | | 11/2014 | Donderici |
| 2014/0368200 | A1 | | 12/2014 | Wang et al. |
| 2015/0241596 | A1 | | 8/2015 | Donderici |
| 2016/0070018 | A1 | * | 3/2016 | Nichols ................... E21B 47/00 324/339 |

OTHER PUBLICATIONS

Mittet et al., Shaping Optimal Transmitter Waveforms for Marine CSEM Surveys, Geophysics, vol. 73, No. 3 (May-Jun. 2008), P.F97-F104.

Myer et al., Broad-Band Waveforms and Robust Processing for Marine CSEM Surveys, Geophysical Journal International (2011) 184, 689-698.

Wang et al., Multicomponent Induction Response in a Borehole Environment, Geophysics, vol. 68, No. 5, Sep.-Oct. 2003, p. 1510-1518.

ISR/WO for PCT/US2015/057311 dated Jul. 26, 2016.

Extended European Search Report for Application No. 15907405.3 dated Aug. 10, 2018.

* cited by examiner

| Channel Name | $f_{1/K}T_1R_{10}P$ | $f_{1/K}T_2R_{10}P$ | $f_{1/K}T_3R_{10}P$ | $f_{1/K}T_4R_{10}P$ | $f_{2/K}T_1R_6P$ | $f_{2/K}T_2R_6P$ | $f_{3/K}T_3R_6P$ | $f_{3/K}T_4R_6P$ | $f_{4/K}T_1R_2A$ | $f_{4/K}T_2R_2A$ | $f_{4/K}T_3R_2A$ | $f_{4/K}T_4R_2A$ |
|---|---|---|---|---|---|---|---|---|---|---|---|---|
| Bin Number | 1 | 1 | 1 | 1 | 1 | 1 | 1 | 1 | 1 | 1 | 1 | 1 |
| Data Weights | 1000 | 1000 | 1000 | 1000 | 500 | 500 | 500 | 500 | 100 | 100 | 100 | 100 |

Table 1

| Channel Name | $f_{1/K}T_1R_{10}P$ | $f_{1/K}T_2R_{10}P$ | $f_{1/K}T_3R_{10}P$ | $f_{1/K}T_4R_{10}P$ | $f_{2/K}T_1R_6P$ | $f_{2/K}T_2R_6P$ | $f_{3/K}T_3R_6P$ | $f_{3/K}T_4R_6P$ | $f_{4/K}T_1R_2A$ | $f_{4/K}T_2R_2A$ | $f_{4/K}T_3R_2A$ | $f_{4/K}T_4R_2A$ |
|---|---|---|---|---|---|---|---|---|---|---|---|---|
| Data Weights | 1000 | 1000 | 1000 | 1000 | 500 | 500 | 500 | 500 | 100 | 100 | 100 | 100 |

Table 2

FREQUENCY RATIOMETRIC PROCESSING OF RESISTIVITY LOGGING TOOL DATA

BACKGROUND

When drilling for hydrocarbons, any of a variety of measurement and transmission techniques are used to provide or record downhole data. Measurements of surrounding subterranean formations may be obtained using downhole measurement and logging tools, such as measurement-while-drilling (MWD) and/or logging-while-drilling (LWD) tools, which help characterize the formations and aid in making operational decisions. Such wellbore logging tools make measurements used to determine the electrical resistivity (or its inverse, conductivity) of the surrounding subterranean formations being penetrated. The electrical resistivity is responsive to various geological features of the formations, and the resistivity measurements can be interpreted to obtain useful information about those formations.

Resistivity logging tools include one or more antennas to obtain formation resistivity values. Such tools often include multiple antenna assemblies (alternately referred to as subs) axially spaced from each other along the tool string. The antenna assemblies make absolute resistivity measurements of the surrounding formation, which are susceptible to amplitude and phase noise that is often unable to be corrected via proper calibration. Moreover, the antenna assemblies measure frequency responses sequentially, which can cause timing and spatial errors due to movement and rotation of the bottom hole assembly as it rotates during operation. As a result, conventional resistivity logging tools often require accurate synchronization between the transmitter antenna and the receiver antenna(s). In some cases, this can require low drift clocks to be deployed on each transmitter and receiver antenna, as well as signal telemetry between the transmitter and receiver antennas.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure relates generally to wellbore logging tools used in the oil and gas industry and, more particularly, to resistivity logging tools designed to transmit multiple signals at known frequencies and amplitudes and subsequently process a ratio of at least two frequency responses to characterize a surrounding subterranean formation.

Embodiments of the present disclosure describe processing improvements for resistivity logging tools in monitoring surrounding subterranean formations adjacent a drilled wellbore. The methods described herein facilitate spectral processing of resistivity logging-while-drilling data for multi-sub resistivity logging tools. Rather than producing relative measurements based on spatial amplitude and phase measurements, the embodiments discussed herein facilitate obtaining relative measurements based on spectral amplitude and phase measurements. Aspects of this disclosure enable multiple frequencies to be transmitted simultaneously with known amplitudes. Advantageously, this may minimize errors due to timing and sampling of the transmitting firing sequence. Relative measurements may then be made by calculating a ratio of receiver responses at two or more known frequencies, which is referred to herein as "frequency ratiometric processing."

The principles of the present disclosure provide several commercial and competitive advantages. For instance, frequency ratiometric processing may be able to support a wide variety of resistivity logging-while-drilling tools and avoids the need to synchronize a transmitter across multiple receiver antenna assemblies. Frequency ratiometric processing also enables multiple frequencies to be transmitted simultaneously with known amplitudes, and enables a known amount of energy to be simultaneously transmitted at selected frequencies. Model studies discussed herein demonstrate that frequency ratiometric processing does not detrimentally affect the depth of investigation of resistivity logging-while-drilling systems for depth-to-bed-boundary inversion processing. Also described herein are methods of optimizing transmitter waveforms for equalizing the energy distributed to two or more harmonic frequencies in resistivity logging tools.

Figure 1:
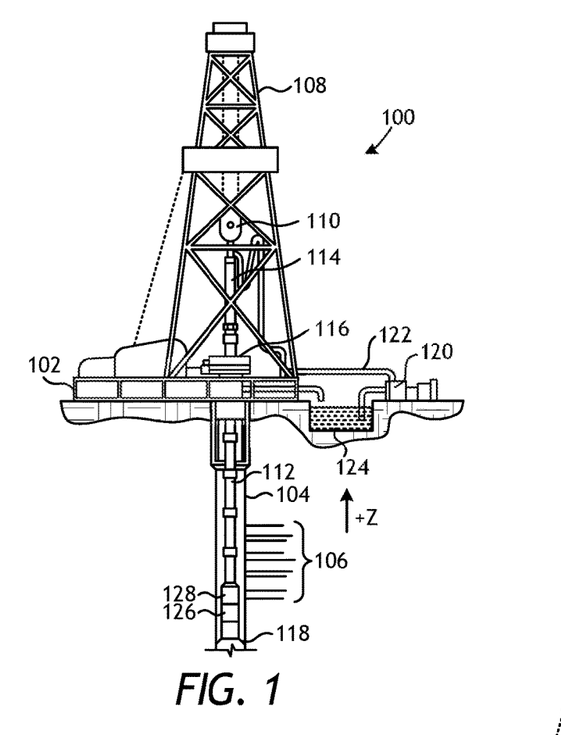
FIG. 1 is a schematic diagram of an exemplary drilling system that may employ the principles of the present disclosure.

FIG. 1 is a schematic diagram of an exemplary drilling system 100 that may employ the principles of the present disclosure, according to one or more embodiments. As illustrated, the drilling system 100 may include a drilling platform 102 positioned at the surface and a wellbore 104 that extends from the drilling platform 102 into one or more subterranean formations 106. In other embodiments, such as in an offshore drilling operation, a volume of water may separate the drilling platform 102 and the wellbore 104.

The drilling system 100 may include a derrick 108 supported by the drilling platform 102 and having a traveling block 110 for raising and lowering a drill string 112. A kelly 114 may support the drill string 112 as it is lowered through a rotary table 116. A drill bit 118 may be coupled to the drill string 112 and driven by a downhole motor and/or by rotation of the drill string 112 by the rotary table 116. As the drill bit 118 rotates, it creates the wellbore 104, which penetrates the subterranean formations 106. A pump 120 may circulate drilling fluid through a feed pipe 122 and the kelly 114, downhole through the interior of drill string 112, through orifices in the drill bit 118, back to the surface via the annulus defined around drill string 112, and into a retention pit 124. The drilling fluid cools the drill bit 118 during operation and transports cuttings from the wellbore 104 into the retention pit 124.

The drilling system 100 may further include a bottom hole assembly (BHA) coupled to the drill string 112 near the drill bit 118. The BHA may comprise various downhole measurement tools such as, but not limited to, measurement-while-drilling (MWD) and logging-while-drilling (LWD) tools, which may be configured to take downhole measurements of drilling conditions. The MWD and LWD tools may include at least one resistivity logging tool 126, which may comprise one or more coil antennas collocated or axially spaced along the length of the resistivity logging tool 126 and capable of receiving and/or transmitting electromagnetic (EM) signals. In some cases, the resistivity logging tool 126 may further comprise a soft magnetic band used to enhance and/or shield the EM signals and thereby increase the azimuthal sensitivity of the resistivity logging tool 126.

As the drill bit 118 extends the wellbore 104 through the formations 106, the resistivity logging tool 126 may continuously or intermittently collect azimuthally-sensitive measurements relating to the resistivity of the formations 106, i.e., how strongly the formations 106 opposes a flow of electric current. The resistivity logging tool 126 and other sensors of the MWD and LWD tools may be communicably coupled to a telemetry module 128 used to transfer measurements and signals from the BHA to a surface receiver (not shown) and/or to receive commands from the surface receiver. The telemetry module 128 may encompass any known means of downhole communication including, but not limited to, a mud pulse telemetry system, an acoustic telemetry system, a wired communications system, a wireless communications system, or any combination thereof. In certain embodiments, some or all of the measurements taken at the resistivity logging tool 126 may also be stored within the resistivity logging tool 126 or the telemetry module 128 for later retrieval at the surface upon retracting the drill string 112.

Figure 2:
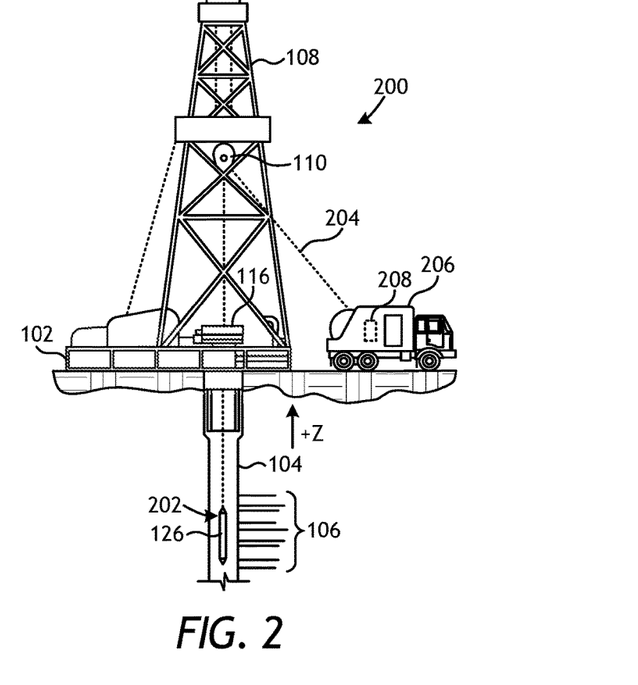
FIG. 2 is a schematic diagram of an exemplary wireline system that may employ the principles of the present disclosure.

At various times during the drilling process, the drill string 112 may be removed from the wellbore 104, as shown in FIG. 2, to conduct measurement/logging operations. More particularly, FIG. 2 depicts a schematic diagram of an exemplary wireline system 200 that may employ the principles of the present disclosure, according to one or more embodiments. Like numerals used in FIGS. 1 and 2 refer to the same components or elements and, therefore, may not be described again. As illustrated, the wireline system 200 may include a wireline instrument sonde 202 that may be suspended into the wellbore 104 by a cable 204. The wireline instrument sonde 202 may include the resistivity logging tool 126 described above, which may be communicably coupled to the cable 204. The cable 204 includes conductors for transporting power to the wireline instrument sonde 202 and also facilitates communication between the surface and the wireline instrument sonde 202. A logging facility 206, shown in FIG. 2 as a truck, may collect measurements from the resistivity logging tool 126, and may include computing and data acquisition systems 208 for controlling, processing, storing, and/or visualizing the measurements gathered by the resistivity logging tool 126. The computing facilities 208 may be communicably coupled to the resistivity logging tool 126 by way of the cable 204.

Figure 3A:
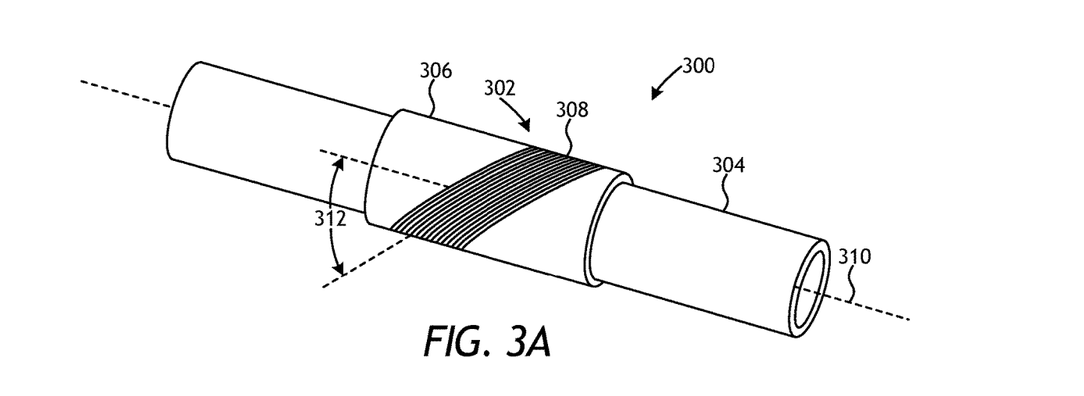
FIGS. 3A and 3B are views of an exemplary antenna assembly.

FIG. 3A is a partial isometric view of an exemplary resistivity logging tool 300. The resistivity logging tool 300 may be the same as or similar to the resistivity logging tool 126 of FIGS. 1 and 2 and, therefore, may be used in the drilling or wireline systems 100, 200 depicted therein. The resistivity logging tool 300 is depicted as including an antenna assembly 302 that can be positioned about a tool mandrel 304, such as a drill collar or the like. The antenna assembly 302 includes a bobbin 306 and a coil 308 wrapped about the bobbin 306 and extending axially by virtue of winding along at least a portion of the outer surface of the bobbin 306.

The bobbin 306 may structurally comprise a high temperature plastic, a thermoplastic, a polymer (e.g., polyimide), a ceramic, or an epoxy material, but could alternatively be made of a variety of other non-magnetic, electrically insulating/non-conductive materials. The bobbin 306 can be fabricated, for example, by additive manufacturing (i.e., 3D printing), molding, injection molding, machining, or other known manufacturing processes.

The coil 308 can include any number of consecutive "turns" (i.e., windings of wire) about the bobbin 306, but will typically include at least two or more consecutive full turns, with each full turn extending 360° about the bobbin 306. In some embodiments, a pathway or guide for receiving the coil 308 may be formed along the outer surface of the bobbin 306. For example, one or more channels may be defined in the outer surface of the bobbin 306 to receive and seat the multiple windings of the coil 308. In other embodiments, however, the bobbin 306 may be omitted altogether from the resistivity logging tool 300, without departing from the scope of the disclosure. In yet other embodiments, a coil-type antenna may not be necessary, such as in the case of laterolog antennas.

The coil 308 can be concentric or eccentric relative to a tool axis 310 of the tool mandrel 304. As illustrated, the turns or windings of the coil 308 extend about the bobbin 306 at a winding angle 312 that is angularly offset from the tool axis 310. As a result, the antenna assembly 302 may be characterized and otherwise referred to as a "tilted coil antenna" or "directional antenna." In the illustrated embodiment, and by way of example, the winding angle 312 is angularly offset from the tool axis 310 by 45°, but could alternatively be any angle offset from the tool axis 310, without departing from the scope of the disclosure.

Figure 3B:
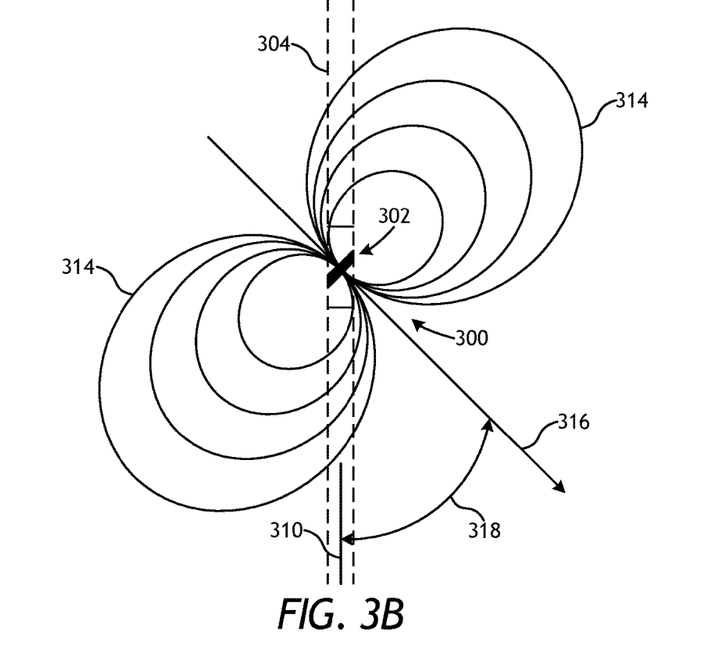

FIG. 3B is a schematic side view of the resistivity logging tool 300 of FIG. 3A. When current is passed through the coil 308 (FIG. 3A) of the antenna assembly 302, a dipole magnetic field 314 may be generated that extends radially outward from the antenna assembly 302 with a dipole magnetic moment 316 that extends generally orthogonal to the winding direction of the coil 308 at a magnetic field angle 318. Accordingly, since the winding angle 312 (FIG. 3A) is 45°, the resulting magnetic field angle 318 will also be 45° offset from the tool axis 310, but opposite the winding angle 312. As will be appreciated, however, the magnetic field angle 318 (i.e., the directionality of the dipole magnetic moment 316) may be varied by adjusting or manipulating the winding angle 312.

Figure 4:
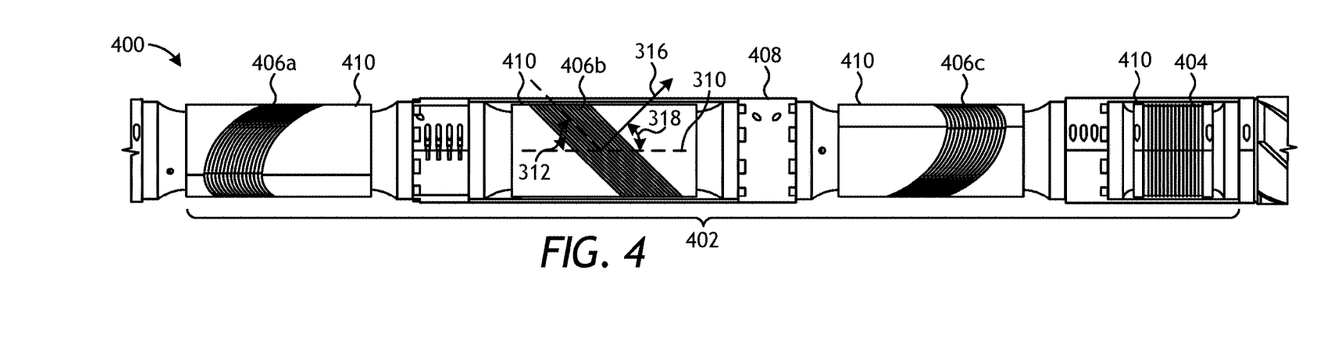
FIG. 4 is a side view of another exemplary resistivity logging tool.

FIG. 4 is a side view of another exemplary resistivity logging tool 400. Similar to the resistivity logging tool 300 of FIGS. 3A-3B, the resistivity logging tool 400 may be the same as or similar to the resistivity logging tool 126 of FIGS. 1 and 2 and, therefore, may be used in the drilling or wireline systems 100, 200 depicted therein. Similar numerals from FIGS. 3A-3B that are used in FIG. 4 refer to similar components or elements that may not be described again.

The resistivity logging tool 400 comprises an antenna assembly 402 that includes a multi-turn coaxial coil 404 and a plurality of multi-turn tilted coils 406, shown as a first tilted coil 406a, a second tilted coil 406b, and a third tilted coil 406c. The coaxial coil 404 and the tilted coils 406a-c may each be positioned about a tool mandrel 408, such as a drill collar or the like, and may also each wrap about individual bobbins 410 similar to the bobbin 306 of FIGS. 3A-3B.

Each tilted coil 406a-c may be azimuthally (circumferentially) offset from each other by 120° about the outer periphery of the tool mandrel 408 and, similar to the coil 308 of FIGS. 3A-3B, each may extend about the respective bobbins 410 at the winding angle 312 angularly offset from the tool axis 310. Accordingly, each tilted coil 406a-c may be oriented to generate corresponding magnetic dipole moments 316 (one shown) that are orthogonal to the winding angle 312. In the event the winding angle is 45°, the corresponding magnetic dipole moment 316 may exhibit a magnetic field angle 318 that is 45° offset from the tool axis 310, but opposite the winding angle 312.

Figure 5:
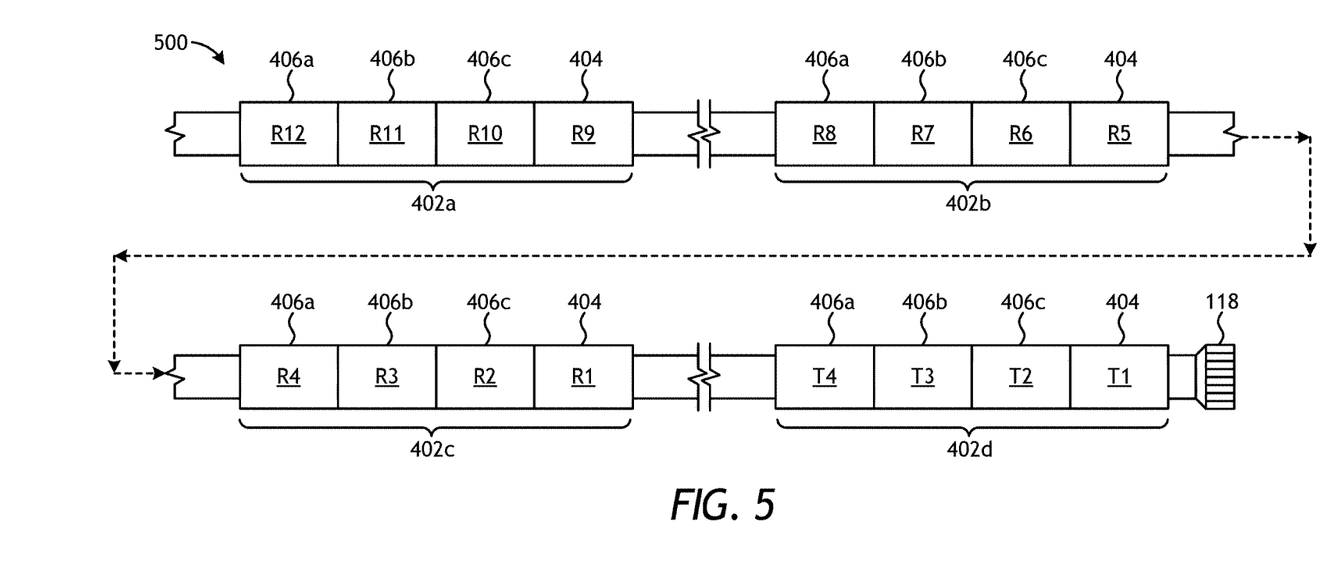
FIG. 5 is a schematic diagram of another exemplary resistivity logging tool that includes multiple antenna assemblies.

Referring now to FIG. 5, with continued reference to FIG. 4, illustrated is a schematic diagram of another exemplary resistivity logging tool 500 that includes multiple antenna assemblies 402. Similar to the resistivity logging tool 400 of FIG. 4, the resistivity logging tool 500 may be used in the drilling or wireline systems 100, 200 of FIGS. 1 and 2, respectively. In the illustrated embodiment, the drill bit 118 is coupled to the distal end of the resistivity logging tool 500, thereby allowing the resistivity logging tool 500 to operate as a logging-while-drilling (LWD) tool during drilling operations.

As illustrated, the resistivity logging tool 500 may include multiple antenna assemblies 402, shown as first, second, third, and fourth antenna assemblies 402a, 402b, 402c, and 402d, respectively. Each antenna assembly 402a-d may be similar to the antenna assembly 402 of FIG. 4 and, therefore, may include a multi-turn coaxial coil 404 and three multi-turn tilted coils 406a-c azimuthally offset from each other by 120°. The antenna assemblies 402a-d may be axially spaced from each other along the length of the resistivity logging tool 500 at nominal spacings of, for example, 25 feet, 50 feet, 100 feet, or any other desired axial spacing. Accordingly, each antenna assembly 402a-d may be arranged on a different tool mandrel, such as being arranged on different lengths of drill pipe of the drill string 112 (FIG. 1).

In the illustrated embodiment, the fourth antenna assembly 402d may be configured and otherwise operable as a transmitting antenna, where the associated coaxial and tilted coils 404, 406a-c each serve as transmitter coils T1-T4, respectively. Moreover, the first, second, and third antenna assemblies 402a-c may each be configured and otherwise operable as receiving antennas, where the associated coaxial and tilted coils 404, 406a-c of each of the first, second, and third antenna assemblies 402a-c serve as individual receiver coils R1-R12. More particularly, the first antenna assembly 402a may include receiver coils R9-R12, the second antenna assembly 402b may include receiver coils R5-R8, and the third antenna assembly 402c may include receiver coils R1-R4. In operation, the transmitter coils T1-T4 of the transmitting antenna 402d may be configured to emit electromagnetic (EM) signals and the receiver coils R1-R12 of the receiving antennas 402a-d may be configured to sense and receive the EM signals from the transmitter coils T1-T4.

For any given pair of transmitter coils T1-T4 and receiver coils R1-R12, a perfectly calibrated resistivity logging tool 500 would measure a complex EM response V according to the following equation:

$$V = ae^{i\theta} \quad \text{Equation (1)}$$

where a is the amplitude of the response signal, and θ is the phase angle of the response signal. The EM response V may comprise an EM potential (e.g., voltage), an EM field component (e.g., magnetic induction), or a transfer function. Moreover, the EM response V can be measured using the same pair of transmitter coils T1-T4 and receiver coils R1-R12 at two or more frequencies. If there is no noise during detection, then the ratio of the multiple frequency responses can be modeled as follows:

$$\frac{V_1}{V_2} = \frac{a_1}{a_2} e^{i(\theta_1 - \theta_2)} \quad \text{Equation (2)}$$

Regardless of source (e.g., geological, instrumentation, etc.), however, noise is usually introduced during signal detection and contaminates the otherwise perfectly calibrated response. The noise contaminated response, denoted as $\tilde{V}$, can be described as follows:

$$\tilde{V} = ne^{i\varphi}[V+b] = nae^{i(\theta+\varphi)} + nbe^{i\varphi} \quad \text{Equation (3)}$$

where n is a multiplicative real amplitude scaling factor (for a perfectly calibrated and noise-free system, n=1.0), φ is the real valued phase error (for a perfectly calibrated and noise-free system, the phase error φ=0.0), and b is a complex-valued bias response (known as the zero-level) that is observed when no fields are present (for a perfectly calibrated system, b=0.0 +0.0i). While it is generally complex valued, the bias response b may alternatively be assumed real-valued for common noise sources (e.g., thermal noise, etc.). Generally, the noise terms are unknown in their values and statistical distributions.

Assuming that the bias response b is real-valued, measuring the noise contaminated response $\tilde{V}$ at two frequencies yields the following:

$$\tilde{V}_1 = n_1 a_1 e^{i(\theta_1 + \varphi_1)} + n_1 b_1 e^{i\varphi_1} = A_1 + B_1 \quad \text{Equation (4)}$$

$$\tilde{V}_2 = n_2 a_2 e^{i(\theta_2 + \varphi_2)} + n_2 b_2 e^{i\varphi_2} = A_2 + B_2 \quad \text{Equation (5)}$$

The ratio of the first and second response signals $\tilde{V}_1$ and $\tilde{V}_2$ yields the following equation:

$$\frac{\tilde{V}_1}{\tilde{V}_2} = \frac{A_1 + B_1}{A_2 + B_2} = \frac{A_1}{A_2}\left(1 + \frac{B_1}{A_1} + \frac{B_2}{A_2} + \ldots\right) \approx \quad \text{Equation (6)}$$

$$\frac{n_1 a_1}{n_2 a_2} e^{i(\theta_1 - \theta_2 + \varphi_1 - \varphi_2)}\left(1 + \frac{b_1}{a_1} e^{-i\theta_1} + \frac{b_2}{a_2} e^{-i\theta_2}\right)$$

If the two noise contaminated response signals $\tilde{V}_1$ and $\tilde{V}_2$ are contaminated by the same (correlated) noise (e.g., 0.2 dB and 0.2 degrees) or errors, then Equation (6) can be rewritten as follows:

$$\frac{\tilde{V}_1}{\tilde{V}_2} = \frac{a_1}{a_2} e^{i(\theta_1 - \theta_2)}\left(1 + \frac{b_1}{a_1} e^{-i\theta_1} \frac{b_2}{a_2} e^{-i\theta_2}\right) \quad \text{Equation (7)}$$

implying that the multiplicative amplitude a and phase errors θ cancel out. If the resistivity logging tool 500 is operated such that the bias response b is much lower than the amplitude a of the response signal (b ≪ a), then:

$$\frac{\tilde{V}_1}{\tilde{V}_2} \approx \frac{a_1}{a_2} e^{i(\theta_1 - \theta_2)} \qquad \text{Equation (8)}$$

which may approximate the perfectly calibrated response signal at two frequencies; thus implying that the noise contributions are relatively insignificant.

Conventional processing of the response signals V (complex voltage signals) for resistivity logging tools proceeds by receiving and measuring the response signals V sequentially as follows:

$$V(\omega_1), V(\omega_2), V(\omega_3), \ldots, V(\omega_N), \qquad \text{Equation (9)}$$

where $\omega$ is the frequency. The sequentially-received response signals V are then fed into an inversion algorithm as absolute responses that are dependent upon transmitter referencing.

Figure 6:
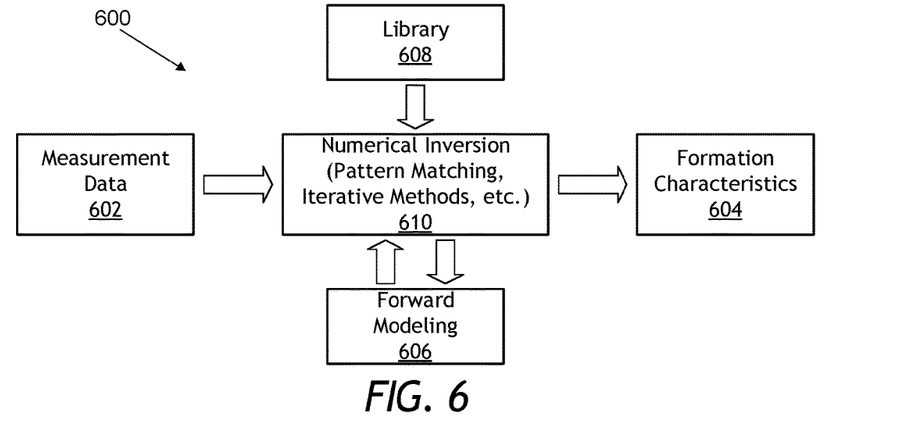
FIG. 6 is a schematic flow chart of an exemplary inversion algorithm that may be applied to the response signals V obtained by the resistivity logging tool of FIG. 5.

FIG. 6 is a schematic flow chart of an exemplary inversion algorithm 600 that may be applied to the response signals V obtained by the resistivity logging tool 500, according to one or more embodiments of the present disclosure. The inversion algorithm 600 may be executed and otherwise performed using a processing module or computer either located downhole (e.g., forming part of the resistivity logging tool 500 or the bottom hole assembly), or at a surface location (e.g., the computing and data acquisition systems 208 of FIG. 2).

The inversion algorithm 600 may prove useful in converting the response signals V derived from the receiver coils R1-R12 (FIG. 5) in the form of frequency-domain or time-domain measurement data 602 to one or more characteristics 604 of the surrounding formation. Performing an inversion operation may include using a forward model 606 and/or a library 608. The forward model 606 provides a set of mathematical relationships for sensor responses that can be applied to determining what a selected sensor would measure when monitoring a particular geological formation. The library 608 may include information regarding various formation characteristics that can be correlated to the measured response signals V from selected receiver coils R1-R12. Example formation characteristics 604 include, but are not limited to, the resistivity of a formation layer, the distance to each formation layer (i.e., distance to bed boundary), the number of layers in the formation, the number of boundaries in each layer of the formation, dip angle with respect to each formation layer, the anisotropy of the formation, dielectric constant, magnetic permeability, etc.

A numerical inversion 610 operation may entail performing an iterative process and/or undertaking a pattern matching process. In particular, the numerical inversion 610 may be performed by iteratively comparing signals of the measurement data 602 with values obtained by the forward model 606 or otherwise stored in the library 608. In at least one example of iterative use of the forward model 606, an initial value or guess of a formation characteristic may be selected based on correlations with various sensors, such as natural gamma ray, acoustic transit time, acoustic shear waves, neutron porosity, density from gamma ray scattering, and NMR-based porosities. The forward model provides a response, and the response is compared with a measured value and a next guess is then generated based on the comparison. The comparison process continues to adjust the formation characteristics until the values of the forward model and the measured results agree within a level of error.

The library 608 can be used in a pattern-matching inversion process. The library 608 may include correspondences between a physical sensor measurement and a property or an identification of the nature of a physical entity (i.e., the surrounding formation) that generated a particular electromagnetic field in response to a sensor signal. For example, measurement of a specific voltage or EM field may be mapped to a specific type of formation or geological characteristic. By comparing the measured value with similar values included in the library 608, a characteristic of the formation can be obtained from the library 608 by a matching process. In some embodiments, for example, a pattern of measured voltages can be matched to voltages in the library 608 to identify the desired formation characteristic 604. Outputs from the numerical inversion 610 provide one or more formation characteristics 604 for the surrounding formation of interest. In at least one embodiment, the formation characteristics 604 may be used to generate two-dimensional or three-dimensional visual models of the surrounding formation.

In conventional signal processing techniques, the raw response signals V derived from LWD resistivity logging tools are received and fed sequentially into the inversion algorithm 600 as absolute responses dependent on transmitter coil T1-T4 (FIG. 5) referencing. Such processing techniques, however, are often plagued with timing and/or spatial errors due to rotation of the resistivity logging tool 500 and, therefore, generally require accurate synchronization between the transmitter coils T1-T5 and the receiver coils R1-R12 (FIG. 5). There can also be issues surrounding synchronizing the received signals with the transmitted signals. For instance, a clock in the receiver coil R1-R12 may not be properly synchronized with a clock in the transmitter coil T1-T5, thereby resulting in phase and frequency errors in the received signals. As a result, outputs from the numerical inversion 610 in conventional signal processing produce relative measurements based on spatial amplitude and phase measurements.

According to embodiments of the present disclosure, rather than sequential transmission and measurement, two or more EM signals may be transmitted simultaneously at known amplitudes via the transmitter coils T1-T4 (FIG. 5). Multiple response signals V may then be subsequently measured simultaneously to avoid timing and spatial errors due to movement and rotation of the resistivity logging tool 500 (FIG. 5), sampling of the transmitting firing sequence, and non-synchronization between transmitter and receiver. As a result, outputs from the numerical inversion 610 according to the present disclosure may produce relative measurements based on spectral amplitude and phase measurements.

Moreover, instead of measuring a sequence of response signals V, as provided in Equation (9), and inverting those as absolute responses dependent upon transmitter referencing, relative formation measurements may be made by calculating a ratio of the response signals V at two or more distinct frequencies. More particularly, transfer functions may be constructed as frequency ratios of the response signals V, and the ratios of the measurements at different frequencies as applied to the same pairs of transmitter coils T1-T4 (FIG. 5) and receiver coils R1-R12 (FIG. 5) may be fed into the inversion algorithm 600 for processing. This process is referred to herein as "frequency ratiometric processing" and can be modeled as follows:

$$V(\omega_1)/V(\omega_1/K), V(\omega_2)/V(\omega_2/K), \ldots V(\omega_N)/V(\omega_N/K) \quad \text{Equation (10)}$$

where K is an integer greater than one; i.e., K=2, 3, . . . . As demonstrated by Equation (2), above, such transfer functions may be independent of transmitter referencing.

Taking a ratio of the different frequency channels has the effect of canceling out some of the errors (e.g., synchronization, etc.) that are common to using diverse frequency channels. More particularly, instead of trying to synchronize the transmitter coils T1-T4 to specific receiver coils R1-R12, which are typically separated by long distances (e.g., 25 ft, 50 ft, 100 ft, etc.), one EM signal frequency may be synchronized to another EM signal frequency at the receiver coil R1-R12 at the same location. When the frequency ratio of the response signals V is taken, as provided by Equation (10), the relative phases are also determined. This eliminates the need to refer phase to the transmitter. Accordingly, when the ratio of response signals V is taken, a resulting ratio signal may be obtained where the phase errors are effectively subtracted from each other. Consequently, instead of feeding the raw responses of Equation (9) into the inversion algorithm 600 of FIG. 6, embodiments of the present disclosure include generating and feeding a new set of frequency ratiometric response signals into the inversion algorithm 600 for processing.

As will be appreciated, the information obtained by the receiver coils R1-R12 may be maximized through frequency ratiometric processing. In some embodiments, each EM signal frequency may be paired with a second EM signal frequency, which may result in a ratio dependent on the first frequency. Ratios of 2:1, 4:2, etc., for example, may be obtained, which essentially doubles the ratiometric measurements obtained. Accordingly, ratiometric frequencies may be selected as multiples of the other. In at least one embodiment, the ratio of frequencies may proceed in the form of a power phase (i.e., 1, 2, 4, 16, etc.). As will be appreciated, selecting frequencies and frequency ratios may be optimized based on simulation of tool responses using different frequencies over a wide range of formation characteristics.

In operation, a surrounding formation may be excited when at least two selected EM signals at two corresponding frequencies are simultaneously transmitted by a given transmitter coil T1-T4 (FIG. 5). In at least one embodiment, however, the two EM signals may be sequentially excited, without departing from the scope of the disclosure. The two EM signals may be transmitted with a known amplitude and phase relationship between them. In some embodiments, the two or more EM signals transmitted by the given transmitter coil T1-T4 may range between about 100 Hz to about 100 kHz. Accordingly, the resistivity logging tool 500 (FIG. 5) may be used in deep formation reading applications having a range of about 100 ft or greater.

In some embodiments, one or both of the phase and the amplitude of the EM signals may be measured and otherwise controlled at the given transmitter coil T1-T4 to ensure a known relationship between the two signal components. In at least one embodiment, this may entail digitally adjusting one or both of the phase and the amplitude of the two or more EM signals at the given transmitter coil T1-T4. Accordingly, the phase and amplitude of each transmitted signal may be stable during measurement.

Response signals V may then be simultaneously (or sequentially) received at a given receiver coil R1-R12 (FIG. 5) for frequency ratiometric processing. A ratio of the response signals V at the different frequencies for the same pair of transmitter coil T1-T4 and receiver coil R1-R12 may then be calculated, and a ratio signal is then inputted into the inversion algorithm 600 for ratiometric frequency processing. In some embodiments, the two or more EM signals used for ratiometric frequency processing may exhibit a known phase difference. In such embodiments, the ratio signal fed into the inversion algorithm 600 may be based on a phase difference ratio. Accordingly, if the phase difference of the transmitters is known, that can alternatively be input into the transmitter, and can be input into the inversion algorithm 600, without departing from the scope of the present disclosure.

In at least one embodiment, three EM signals may be simultaneously (or sequentially) transmitted by a given transmitter coil T1-T4, where the three EM signals have a known amplitude and phase relation between them. Two ratios of the three EM signals at varying frequencies may then be calculated to obtain the ratio signal, such as a first ratio between the first and second EM signals, and a second ratio between the second and third EM signals. One of the two ratios that determine the ratio signal may alternatively comprise a ratio between the first and third EM signals, without departing from the scope of the disclosure.

In some embodiments, the two or more EM signals may be generated by transmitting a pulse from the given transmitter coil T1-T4, such as by transmitting mixed multiple sinusoidal waveforms, which would result in multiple sinusoids. The transmitted pulse could alternatively comprise a rectangular or any other shaped pulse composed of multiple frequencies. In at least one embodiment, the multiple frequencies may be harmonics of each other, which may prove advantageous in providing the known relationship between phase and amplitude of the frequency.

If a square wave F[t] is transmitted having a period of T, then the EM signal will have harmonic content according to the following relation:

$$F[t] = \frac{4}{\pi} \sum_{n=0}^{\infty} \frac{1}{2*n+1} \mathrm{Sin}\left[\frac{(2*n+1)*2\pi*x}{T}\right] \quad \text{Equation (11)}$$

In this case, the frequency of the fundamental is $2\pi/T$ per second, and every odd harmonic of this frequency is present. The series can be truncated, and to produce a single pulse, transmission can occur for a time interval of ½ of the period of the fundamental.

More generally, if the EM signal is a rectangular wave such that the pattern $$F[t] = 1 \text{ for} -n \leq t < -\frac{\pi}{Q}$$

$$F[t] = 0 \text{ for} -\frac{\pi}{Q} \leq t < n \text{ for some } Q > 1,$$

and with a periodicity of $\pi$, then a Fourier representation of F[t] is given by:

$$F[t] = \frac{\left(1 - \frac{1}{Q}\right)}{2} - \sum_{n=1}^{\infty} \frac{\mathrm{Sin}\left[\frac{n*\pi}{Q}\right]}{n} * \mathrm{Cos}[n*t]/\pi +$$

$$\sum_{n=1}^{\infty} \frac{(-1)^n - \cos\left[\frac{n*\pi}{Q}\right]}{n} * \sin[n*t]/\pi$$

The following description describes a synthetic two-layer depth-to-bed-boundary (DTBB) inversion study based upon frequency ratiometric processing of data derived from a LWD resistivity logging tool (e.g., the resistivity logging tool 500 of FIG. 5). The following example is used for illustrative purposes to demonstrate the advantages of ratiometric frequency processing, and should not be considered as necessarily limiting to the present disclosure.

Since isotropic formation models are known a priori, the maximum detection distance is defined by the error in the recovered model distance parameter:

$$\epsilon(d) = \frac{|d^{inv} - d^{exc}|}{|d^{exc}|} \quad \text{Equation (13)}$$

where ε(d) is the distance to a particular boundary layer in the surrounding formation; $d_{inv}$ is the computed distance to a particular boundary layer in the formation provided by the inversion algorithm; and $d_{exc}$ is the true (exact) distance to the boundary layer.

According to the above definition of relative distance detection error ε(d), a maximum detection distance $d_{Max}$ can be evaluated with a threshold on the error. The error threshold $d_{Max}$ is defined as the maximum distance at which the distance detection error ε(d) in the DTBB inversion is less than 10% for three (3) successive models, and neglecting all errors in the upper and lower layer resistivities.

In the results that follow, the two-layer DTBB inversion is performed on the assumptions that multiple initial guesses are used (i.e., "automatic" option), and the final model is selected as having the minimum residual error.

In the present example, the resistivity logging tool (e.g., the resistivity logging tool 500 of FIG. 5) is operated at four (4) frequencies: f1, f2, f3, and f4, where f1<f2<f3<f4, and where the frequencies f1-f4 range between about 100 Hz and about 100 kHz. In what follows, the ratio signal is referenced as:

$$f_{i/K} T_j R_n (A/P) \quad \text{Equation (14)}$$

where i=1, 2, 3, 4 is the frequency index (1≡f1; 2≡f2; 3≡f3; 4≡f4), K is the frequency ratiometric index and equals two (2) or three (3), $T_j$ is the transmitter index where j=1, 2, 3, 4, $R_n$ is the receiver index where n=1, 2, ..., 12, and (A/P) is the amplitude or phase reference (depending on whether amplitude or phase is being measured). The frequency ratiometric responses are defined as the amplitude and/or phase components of the following:

$$V(f_{i/K} T_j R_n) = \frac{V(f_i, T_j, R_n)}{V\left(\frac{f_i}{K}, T_j, R_n\right)} \quad \text{Equation (15)}$$

Figure 7:
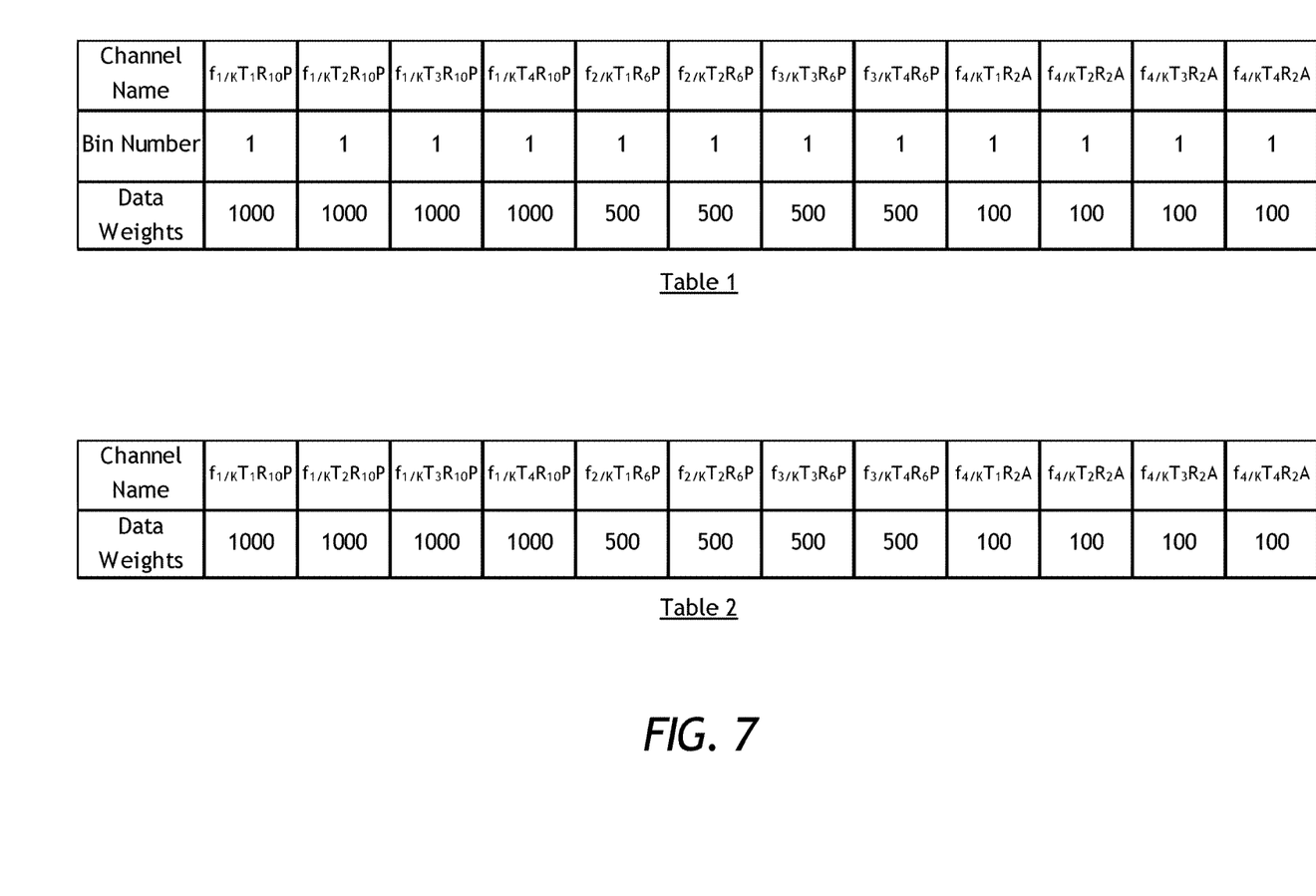
FIG. 7 depicts two tables that provide measurement sets used to obtain representative data responses.

FIG. 7 provides two tables that depict measurement sets used to obtain the representative data responses for the study. Each measurement set consists of different pairs of transmitter coils T1-T4 and receiver coils R1-R12, as initially described with reference to FIG. 5. Table 1 in FIG. 7 details the measurement set used for a rotating mode of the example, and Table 2 details the measurement set used for a sliding mode of the example. The channel name in each table provides information as to which frequency f1-f4 was used, which transmitter coil T1-T4 was used, which receiver coil R1-R12 was used, and whether amplitude A or phase P was being measured.

In Table 1, the bin number refers to an azimuthal location or orientation as the resistivity logging tool rotates within a borehole. Accordingly, in at least one embodiment, formation measurements may be taken azimuthally. Ratios of the same bin may be processed, or ratios of different bins (i.e., difference azimuthal orientations) may alternatively be processed. As indicated in Table 1, each measurement for the rotating mode example was taken at the same azimuthal location. Data weights can be introduced to bias the sensitivity of a given datum to a given model parameter. The data weights in both Tables 1 and 2 correspond to the axial separation distance between the selected pair of transmitter and receiver coils, and the magnitude of the data weight may be used in the inversion algorithm 600 of FIG. 6. More particularly, the larger the data weight, the more influence the response will have in the inversion operation 610 (FIG. 6).

To assess the performance (effectiveness) of the frequency ratiometric processing, a first study was performed to evaluate a noiseless case. A second study was then performed with noise of 0.2 dB, a phase noise of 0.2 degrees, and 1 nV additive noise was then inputted to contaminate each of the voltage responses prior to frequency ratiometric processing. The noise (error) was added as follows:

$$V_{noise}(f_i, T_j, R_n) / V_{noise}\left(\frac{f_i}{K}, T_j, R_n\right) \quad \text{Equation (16)}$$

In this case, the same 0.2 dB amplitude, 0.2 degrees, and 1 nV additive noise were contaminated each of the voltage responses prior to frequency ratiometric processing. Upon review of the two-layer DTBB inversion results for the noiseless case, it was noted that all parameters were recovered perfectly for the noiseless case. When noise was contaminated, the inversion performance was deteriorated. However, the depth of investigation (DoI) is not adversely affected by frequency ratiometric processing for relative dip angle equal to 90°, which is the most common case of geosteering. This tendency is far more pronounced when there is no correlation between the noise components at different frequencies.

The maximum distances decrease as the dip angle reduces from 90° to 75° and 45° degrees. One unexpected result was to see the maximum distance getting shorter for higher local resistivity as compared to lower ones. As known, the larger the resistivity around the wellbore, the deeper the tool is able to see. However, this is valid only for a noiseless case. With given noise level and definition like the one described above, the noise effect is more influential to those cases with higher local resistivity around the wellbore because their tool responses change more gradually.

Since LWD comprises a dynamic measurement, according to the present disclosure, at least two response signals V may be acquired simultaneously. A given transmitter coil T1-T4 can be operated with a sinusoidal waveform transmitter current, but this typically needs to be sequentially operated at two or more frequencies. As mentioned above, this type of frequency sequencing can introduce timing and position errors.

More particularly, the given transmitter coil T1-T4 can be operated with a 50% duty cycle bipolar square waveform transmitter current. The time-domain response can then be Fourier transformed to retrieve the base frequency and odd harmonic frequencies. However, the amplitudes of the harmonic frequencies rapidly decrease with increasing frequency. In some embodiments, this may be sufficient, but in general it is preferred that the two frequencies have the same amplitudes such that the effects cancel, per Equation (6) above. Otherwise, the signal-to-noise ratio (SNR) for each frequency may be sufficiently different to bias the frequency ratiometric processing.

Consider the Fourier series expansion of an arbitrary time-domain waveform:

$$f(t) = \frac{a_0}{2} + \sum_{n=1}^{\infty} a_n \cos\left(\frac{2\pi nt}{T}\right) + \sum_{n=1}^{\infty} b_n \sin\left(\frac{2\pi nt}{T}\right) \quad \text{Equation (17)}$$

where $a_0$ is used if $a_n$ and $b_n$ have coefficients of 2/T*, and where the Fourier coefficients are:

$$a_0 = \frac{1}{T} \int_{-T/2}^{T/2} f(t) dt \quad \text{Equation (18)}$$

$$a_n = \frac{2}{T} \int_{-T/2}^{T/2} f(t) \cos\left(\frac{2\pi nt}{T}\right) dt \quad \text{Equation (19)}$$

$$b_n = \frac{2}{T} \int_{-T/2}^{T/2} f(t) \sin\left(\frac{2\pi nt}{T}\right) dt \quad \text{Equation (20)}$$

where T is the time length of one full duty cycle (waveform), t is time, and n is the harmonic number. The Fourier expansion of Equation (17) provides that any waveform can be decomposed into parts with mirror and rotational symmetry about t=0 (i.e., symmetric and antisymmetric behavior about t=0). If the waveform avoids direct current bias, then the Fourier coefficient from Equation (18) will be zero.

Figure 8:
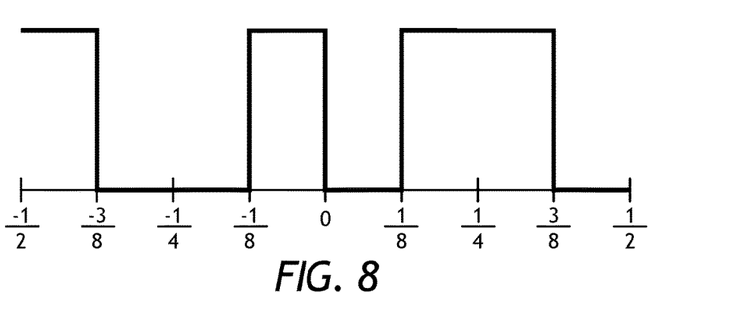
FIG. 8 depicts an example transmitter waveform that may be used in accordance with the present disclosure.

FIG. 8 depicts an example transmitter waveform that may be used in accordance with the present disclosure. Preferred transmitter waveforms are doubly symmetric, as shown in FIG. 8. Doubly symmetric waveforms may prove advantageous since they can be expressed in a discrete mathematical form which makes it possible to optimize the waveform for a given criteria. A solution of Equation (20) that has this symmetry is of the general solution:

$$b_n = \frac{4}{\pi n}\left[\frac{1}{2}\cos(\pi n) - \frac{1}{2} + \sum_{j=1}^{\tau}(-1)^j\left[\cos(2\pi n t_j) + \cos\left(2\pi n\left\{\frac{T}{2} + t_j\right\}\right)\right]\right] \quad \text{Equation (21)}$$

where τ is the number of transitions in the first quarter of the waveform, and $t_j$ is the time of each transition in that quarter expressed as a function of T (where T=1 and all time has been divided by the period of the waveform). It is noted that when n is even, the terms cancel, thereby effectively eliminating all even harmonics. As will be appreciated, this implies that only odd harmonics can exist.

From Equation (21), a given waveform signal can be constructed. For example, consider the waveform shown in FIG. 8, which has rotational symmetry about t=0 such that the Fourier coefficients $a_n$ derived from Equation (19) are zero. Consequently, Equation (21) reduces to:

$$b_n = \frac{4}{\pi n}\left[\frac{1}{2}\cos(\pi n) - \frac{1}{2} + \cos\left(2\pi n\frac{1}{8}\right) - \cos\left(2\pi n\frac{3}{8}\right)\right] \quad \text{Equation (22)}$$

which can be re-written as:

$$b_n = \frac{4}{\pi n}\left[\frac{1}{2}\cos\left(2\pi n\frac{4}{8}\right) - \cos\left(2\pi n\frac{3}{8}\right) + \cos\left(2\pi n\frac{1}{8}\right) - \frac{1}{2}\right] \quad \text{Equation (23)}$$

where the fractions are written such that each term corresponds to a polarity transition in the waveform. With a deterministic solution as provided in Equation (22) for the Fourier coefficients, the waveform can be optimized such that, for example:

$$|b_3 - b_5| \to \min$$

which implies that the third and fifth harmonics have (approximately, if not identically) equal amplitude.

Figure 9:
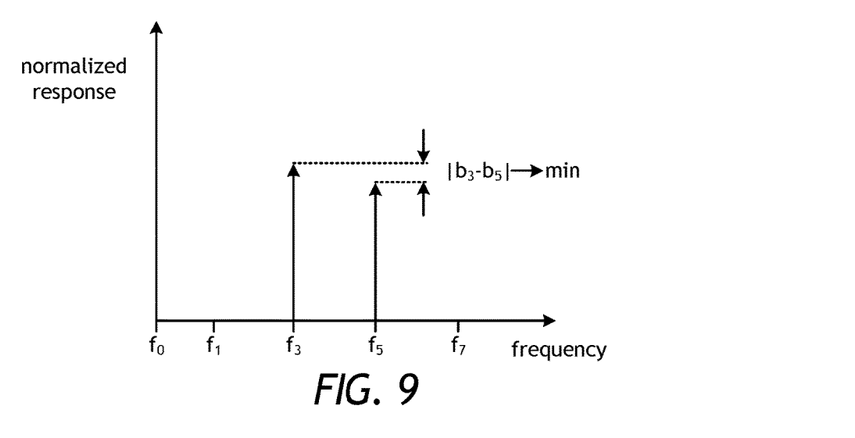
FIG. 9 depicts an example of criteria whereby the amplitude of the third and fifth harmonics of the waveform of FIG. 8 are optimized such that the difference between their amplitudes are minimized.

This can be seen, for example, in FIG. 9, which depicts an example of criteria whereby the amplitude of the third and fifth harmonics of the waveform of FIG. 8 are optimized such that the difference between their amplitudes are minimized (ideally zero). If, in FIG. 8, instead of ⅛, 1/M is used, and instead of ⅜, (½-1/M) is used, the magnitude of $b_3$-$b_5$ in FIG. 9 reduces to only 0.0885128 for M=9, which constitutes an potential optimization. This optimization can be performed subject to a number of tool-specific electronic and hardware parameters such as, but not limited to, waveform length, base frequency of the signal, transmitter switching frequency, transmitter ramp up and ramp down times (related to transmitter induction), receiver sampling frequency, at least two samples per transition (to satisfy the sampling theorem). The optimization may be performed by extensive parameter sweeping, or by a (global) stochastic search such as a Monte Carlo, simulated annealing, or genetic algorithm.

In some embodiments, one or more of the transmitter coils T1-T4 of FIG. 5 may be configured to transmit EM signals at multiple frequencies, and the receiver coils R1-R12 of FIG. 5 may likewise be configured to receive the EM signals at the multiple frequencies. In an embodiment, for instance, one or more of the transmitter coils T1-T4 may comprise a broadband antenna with one or more signal filters used to transmit the EM signals at a predetermined one or more frequencies. In another embodiment, the EM signals may be tuned to a particular or predetermined one or more frequencies. In such an embodiment, the associated transmitter coil T1-T4 would remain untuned (i.e., no filters), but a broadband pre-amplifier connected in parallel with a pair of filters may be included between the transmitter coil T1-T4 and the receiver coils R1-R12 to selectively tune the EM signals to desired frequencies to be received by the corresponding receiver coil R1-R12.

Figure 10:
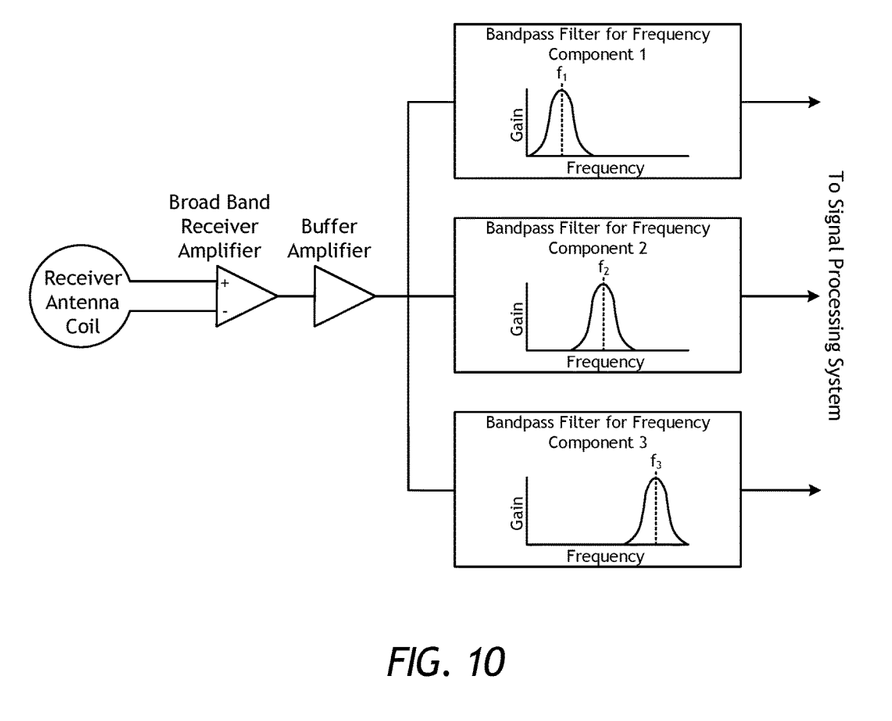
FIG. 10 is an exemplary circuit diagram and signal processing schematic.

FIG. 10, for example, shows an exemplary circuit diagram and signal processing schematic, according to one or more embodiments. In the illustrated embodiment, a broadband preamplifier may be connected to each receiver coil R1-R12, and the broadband amplifier may then be connected with two or more parallel bandpass filters. One bandpass filter may be included for each transmitted frequency $f_1$, $f_2$, $f_3$, etc. As illustrated, the bandpass filter corresponding to a particular transmitted frequency $f_1$-$f_3$ would have its bandpass centered at that frequency.

It should be noted that, while the antenna assemblies have been described herein with respect to MWD and/or LWD applications, it will be appreciated that the principles of the present disclosure are equally applicable to antenna assemblies (i.e., transmitters and/or receivers) permanently deployed behind casing, for example, and forming part of a reservoir monitoring system.

Computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable read only memory (EROM)), registers, hard disks, removable disks, CD-ROMS, DVDs, or any other like suitable storage device or medium.

Executable sequences described herein can be implemented with one or more sequences of code contained in the memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM, and flash EPROM.

Embodiments disclosed herein include:

A. A method that includes introducing a resistivity logging tool including one or more transmitter coils and one or more receiver coils into a wellbore, transmitting a first signal at a first frequency and a second signal at a second frequency different from the first frequency with a first transmitter coil, receiving with a first receiver coil a first response signal based on the first signal and a second response signal based on the second signal, calculating a ratio between the first and second response signals and thereby obtaining a ratio signal, processing the ratio signal in an inversion algorithm, and determining one or more formation characteristics of a subterranean formation based on the ratio signal as processed by the inversion algorithm.

B. A well system that includes a resistivity logging tool conveyable into a wellbore and including one or more transmitter coils and one or more receiver coils, and a computer system including a processor and a non-transitory computer readable medium, the computer system being communicably coupled to the resistivity logging tool, and the computer readable medium storing a computer readable program code that, when executed by the processor, configures the processor to transmit a first signal a first frequency and a second signal at a second frequency different from the first frequency with a first transmitter coil, receive with a first receiver coil a first response signal based on the first signal and a second response signal based on the second signal, calculate a ratio between the first and second response signals and thereby obtaining a ratio signal, process the ratio signal in an inversion algorithm, and determine one or more formation characteristics of a subterranean formation based on the ratio signal as processed by the inversion algorithm.

Each of embodiments A and B may have one or more of the following additional elements in any combination: Element 1: further comprising transmitting the first and second signals simultaneously with the first transmitter coil. Element 2: further comprising transmitting the first and second signals sequentially with the first transmitter coil. Element 3: further comprising transmitting the first and second signals with a known amplitude and phase relationship between the first and second signals. Element 4: further comprising measuring and controlling at least one of a phase and an amplitude of the first and second signals at the first transmitter coil and thereby ensuring the known amplitude and phase relationship. Element 5: wherein the first and second frequencies range between 100 Hz and 100 kHz. Element 6: further comprising transmitting the first and second signals with a known phase difference between the first and second signals. Element 7: further comprising transmitting a third signal at a third frequency with the first transmitter coil, receiving a third response signal based on the third signal with the first receiver coil, and calculating the ratio signal based on a ratio of two of the first, second, and third response signals. Element 8: further comprising transmitting the first, second, and third signals with a known amplitude and phase relationship between the first, second, and third signals. Element 9: wherein the one or more formation characteristics of the subterranean formation are selected from the group consisting of resistivity of a formation layer, a distance to each formation layer in the subterranean formation, a number of layers in the subterranean formation, a number of boundaries in each formation layer in the subterranean formation, dip angle with respect to each formation layer, dielectric constant, magnetic permeability, and anisotropy of the subterranean formation. Element 10: further comprising generating a two-dimensional or a three-dimensional visual model of the subterranean formation based on the one or more formation characteristics. Element 11: further comprising receiving the first and second response signals azimuthally as the resistivity logging tool rotates within the wellbore. Element 12: wherein the first receiver antenna is a tilted coil antenna. Element 13: wherein the receiving antenna is a first receiving antenna and the resistivity logging tool further includes a second receiving antenna that includes one or more receiver coils. Element 14: wherein the resistivity logging tool is operatively coupled to a drill string and introducing the resistivity logging tool into the wellbore further comprises extending the resistivity logging tool into the wellbore on the drill string, and drilling a portion of the wellbore with a drill bit secured to a distal end of the drill string. Element 15: wherein introducing the resistivity logging tool into the wellbore further comprises extending the resistivity logging tool into the wellbore on wireline as part of a wireline instrument sonde. Element 16: wherein the first and second signals at the first and second frequencies comprise the transmitted waveform, and are separated by performing Fourier transform on the received waveforms. Element 17: further comprising optimizing the first and second waveforms by maximizing energy distributed to two or more harmonic frequencies.

Element 18: herein the processor is further configured to transmit the first and second signals simultaneously with the first transmitter coil. Element 19: wherein the first transmitter coil comprises a broadband antenna with one or more signal filters used to transmit the first and second signals at the first and second frequencies, respectively. Element 20: further comprising a broadband pre-amplifier connected to the one or more receiver coils and two or more parallel bandpass filters to selectively tune the first and second signals to the first and second frequencies, respectively.

By way of non-limiting example, exemplary combinations applicable to A and B include: Element 3 with Element 4; Element 7 with Element 8; Element 11 with Element 12; and Element 16 with Element 17.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
    introducing a resistivity logging tool including one or more transmitter coils and one or more receiver coils into a wellbore;
    transmitting a first signal at a first frequency and a second signal at a second frequency different from the first frequency with a first transmitter coil, the first signal and the second signal being transmitted simultaneously with predetermined amplitudes;
    receiving with a first receiver coil a first response signal based on the first signal and a second response signal based on the second signal, the first response signal and the second response signal being received simultaneously at the first frequency and the second frequency, respectively;
    calculating a ratio between the first and second response signals and thereby obtaining a ratio signal;
    processing the ratio signal in an inversion algorithm;
    determining one or more formation characteristics of a subterranean formation based on the ratio signal as processed by the inversion algorithm;
    generating a multi-dimensional characterization of the subterranean formation from the determined one or more formation characteristics;
    performing a drilling operation in the wellbore using the multi-dimensional characterization of the subterranean formation; and
    generating a two-dimensional or a three-dimensional visual model of the subterranean formation based on the one or more formation characteristics.

2. The method of claim 1, further comprising transmitting the first and second signals with a known amplitude and phase relationship between the first and second signals.

3. The method of claim 2, further comprising measuring and controlling at least one of a phase and an amplitude of the first and second signals at the first transmitter coil and thereby ensuring the known amplitude and phase relationship.

4. The method of claim 1, wherein the first and second frequencies range between 100 Hz and 100 kHz.

5. The method of claim 1, further comprising transmitting the first and second signals with a known phase difference between the first and second signals.

6. The method of claim 1, further comprising:
    transmitting, a third signal at a third frequency with the first transmitter coil;
    receiving a third response signal based on the third signal with the first receiver coil; and
    calculating the ratio signal based on a ratio of two of the first, second, and third response signals.

7. The method of claim 6, further comprising transmitting the first, second, and third signals with a known amplitude and phase relationship between the first, second, and third signals.

8. The method of claim 1, wherein the one or more formation characteristics of the subterranean formation are selected from the group consisting of resistivity of a formation layer, a distance to each formation layer in the subterranean formation, a number of layers in the subterranean formation, a number of boundaries in each formation layer in the subterranean formation, dip angle with respect to each formation layer, dielectric constant, magnetic permeability, and anisotropy of the subterranean formation.

9. The method of claim 1, further comprising receiving the first and second response signals azimuthally as the resistivity logging tool rotates within the wellbore.

10. The method of claim 9, wherein the first receiver antenna is a tilted coil antenna.

11. The method of claim 1, wherein the receiving antenna is a first receiving antenna and the resistivity logging tool further includes a second receiving antenna that includes one or more receiver coils.

12. The method of claim 1, wherein the resistivity logging tool is operatively coupled to a drill string and introducing the resistivity logging tool into the wellbore further comprises:
    extending the resistivity logging tool into the wellbore on the drill string; and
    drilling a portion of the wellbore with a drill bit secured to a distal end of the drill string.

13. The method of claim 1, wherein introducing the resistivity logging tool into the wellbore further comprises extending the resistivity logging tool into the wellbore on wireline as part of a wireline instrument sonde.

14. The method of claim 1, wherein the first and second signals at the first and second frequencies comprise the transmitted waveform and are separated, by performing Fourier transform on the received waveforms.

15. The method of claim 14, further comprising optimizing the first and second waveforms by maximizing energy distributed to two or more harmonic frequencies.

16. A well system, comprising:
    a resistivity logging tool conveyable into a wellbore and including a plurality of antenna assemblies, each of the plurality of antenna assemblies comprising:
        one or more transmitter coils, wherein a first transmitter coil of the one or more transmitter coils is configured to transmit a first signal at a first frequency and a second signal at a second frequency different from the first frequency, the first signal and the second signal being transmitted simultaneously with predetermined amplitudes; and
        one or more receiver coils, wherein a first receiver coil of the one or more receiver coils is configured to:
            receive a first response signal based on the first signal and a second response signal based on the second signal, the first response signal and the second response signal being, received simultaneously at the first frequency and the second frequency, respectively; and
    a computer system including a processor and a non-transitory computer readable medium, the computer system being communicably coupled to the resistivity logging tool, and the computer readable medium storing instructions that when executed by the processor, cause the processor to:
    calculate a ratio between the first and second response signals; obtain a ratio signal from the calculated ratio;
    process the ratio signal in an inversion algorithm;
    determine one or more formation characteristics of a subterranean formation based on the ratio signal as processed with the inversion algorithm;
    generate a multi-dimensional characterization of the subterranean formation from the determined one or more formation characteristics; and
    generate a two-dimensional or a three-dimensional visual model of the subterranean formation based on the one or more formation characteristics.

17. The well system of claim 16, wherein the first transmitter coil comprises a broadband antenna with one or more signal filters used to transmit the first and second signals at the first and second frequencies, respectively.

18. The well system of claim 16, further comprising a broadband pre-amplifier connected to the one or more receiver coils and two or more parallel bandpass filters to selectively tune the first and second signals to the first and second frequencies, respectively.

* * * * *